US012162239B2

(12) United States Patent
Hamlin et al.

(10) Patent No.: US 12,162,239 B2
(45) Date of Patent: Dec. 10, 2024

(54) SYSTEM WITH ARCUATE SLOT FOR FEEDING SHEET MATERIAL

(71) Applicant: Sealed Air Corporation (US), Charlotte, NC (US)

(72) Inventors: Christopher C. Hamlin, Worcester, MA (US); Thomas P. Orsini, Sterling, MA (US); Russell T. Christman, Dunstable, MA (US)

(73) Assignee: Sealed Air Corporation (US), Charlotte, NC (US)

(*) Notice: Subject to any disclaimer, the term of this patent is extended or adjusted under 35 U.S.C. 154(b) by 0 days.

(21) Appl. No.: 17/773,078

(22) PCT Filed: Oct. 29, 2020

(86) PCT No.: PCT/US2020/057929

§ 371 (c)(1),
(2) Date: Apr. 29, 2022

(87) PCT Pub. No.: WO2021/087092

PCT Pub. Date: May 6, 2021

(65) Prior Publication Data

US 2024/0140063 A1 May 2, 2024

Related U.S. Application Data

(60) Provisional application No. 62/929,128, filed on Nov. 1, 2019.

(51) Int. Cl.
*B31D 5/00* (2017.01)

(52) U.S. Cl.
CPC .... *B31D 5/0047* (2013.01); *B31D 2205/0023* (2013.01); *B31D 2205/0035* (2013.01); *B31D 2205/0047* (2013.01); *B31D 2205/0082* (2013.01)

(58) Field of Classification Search
CPC .................................................... B31D 5/0047
USPC .......................................................... 493/464
See application file for complete search history.

(56) References Cited

U.S. PATENT DOCUMENTS 5,183,157 A 2/1993 Darden
5,188,581 A * 2/1993 Baldacci .............. B31D 5/0047 493/402
6,106,452 A * 8/2000 Baumuller ........... B31D 5/0047 493/464
6,758,801 B2 * 7/2004 Harding ............. C09D 119/003 493/464

(Continued)

*Primary Examiner* — Praachi M Pathak
(74) *Attorney, Agent, or Firm* — Jon M. Isaacson

(57) ABSTRACT

A dunnage conversion system (100) includes a supply area (120), a dunnage conversion machine (110), and an arcuate slot (130). The supply area (120) is configured to hold a supply of a sheet material (122). The sheet material (122) is in a substantially flat configuration in the supply area (120). The dunnage conversion machine (110) is configured to pull the sheet material (122) from the supply area (120) and to convert the sheet material (122) into a non-flat configuration. The arcuate slot (130) is positioned between the supply area (120) and the dunnage conversion machine (110) such that the sheet material (122) is fed through the arcuate slot (130) as the sheet material (122) passes along a path from the supply area (120) to the dunnage conversion machine (110).

20 Claims, 6 Drawing Sheets

(56) References Cited

U.S. PATENT DOCUMENTS

| | | | | |
|---|---|---|---|---|
| 7,210,416 | B1 * | 5/2007 | Grigsby, Jr. | A47B 96/202<br>108/165 |
| 7,479,100 | B2 * | 1/2009 | Toth | B65H 23/08<br>493/464 |
| 7,585,268 | B2 * | 9/2009 | Cheich | B65D 83/0805<br>493/464 |
| 7,744,519 | B2 * | 6/2010 | Wetsch | B31D 5/0052<br>493/464 |
| 9,027,872 | B2 | 5/2015 | Flood | |
| 9,849,646 | B2 * | 12/2017 | Townsend | B31D 5/0047 |
| 11,007,746 | B2 * | 5/2021 | Wetsch | B31D 5/0047 |
| 2003/0092552 | A1 | 5/2003 | Armington et al. | |
| 2007/0117703 | A1 * | 5/2007 | Cavaliere | B31D 5/0052<br>493/464 |
| 2007/0117705 | A1 | 5/2007 | Toth | |
| 2007/0194036 | A1 | 8/2007 | Barella | |
| 2009/0100785 | A1 * | 4/2009 | Tanner | E06B 1/68<br>52/717.01 |
| 2010/0029456 | A1 * | 2/2010 | Cheich | B31D 5/0043<br>493/464 |
| 2010/0176021 | A1 * | 7/2010 | Gordon | B65D 83/0805<br>206/494 |
| 2011/0295409 | A1 | 12/2011 | Mierzejewski | |
| 2012/0165172 | A1 * | 6/2012 | Wetsch | B65H 35/008<br>493/464 |
| 2012/0283084 | A1 | 11/2012 | Cheich et al. | |
| 2018/0326691 | A1 | 11/2018 | Wetsch et al. | |
| 2019/0168953 | A1 | 6/2019 | O'Malley | |
| 2021/0086466 | A1 * | 3/2021 | Schalk | B31D 5/0047 |

* cited by examiner

SYSTEM WITH ARCUATE SLOT FOR FEEDING SHEET MATERIAL

BACKGROUND

The present disclosure is in the technical field of sheet material feed systems. More particularly, the present disclosure is directed to feed systems for dunnage conversion systems that properly manipulate the sheet material before the sheet material reaches the dunnage conversion system.

Machines for producing void fill material from paper are well-known in the art. Such machines generally operate by pulling a web of paper from a roll or fanfold paper, manipulating the paper web in such a way as to convert the paper into void fill material, and then severing the converted material into cut sections of a desired length.

While such machines are widely used and have been commercially successful, in many applications, there is a need for improved functionality. For example, when paper is fed through these machines, the drive systems tend to pull the paper in such a way that can cause the paper to rip or tear. Additionally, the paper can become easily misaligned while being fed by the drive systems.

Traditional approaches to reducing these issues can greatly increase the cost of the drive systems. It would be advantageous to have a feed path and a drive system that address the issues of damaging and misaligning the paper as the paper is fed by the drive system without significantly increasing the cost of the drive system.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first embodiment, a dunnage conversion system includes a supply area, a dunnage conversion machine, and an arcuate slot. The supply area is configured to hold a supply of a sheet material. The sheet material is in a substantially flat configuration in the supply area. The dunnage conversion machine is configured to pull the sheet material from the supply area and to convert the sheet material into a non-flat configuration. The arcuate slot is positioned between the supply area and the dunnage conversion machine such that the sheet material is fed through the arcuate slot as the sheet material passes along a path from the supply area to the dunnage conversion machine.

In a second embodiment, the arcuate slot of the first embodiment is configured to cause the sheet material to have a curvature with a radius of the curvature normal to a direction of travel of the sheet material on the path from the supply area to the dunnage conversion machine.

In a third embodiment, the dunnage conversion system of any of the preceding embodiments further includes a funneling member having a funneling passage. The funneling member is positioned such that the sheet material passes through the funneling passage of the funneling member after passing through the arcuate slot on the path from the supply area to the dunnage conversion machine.

In a fourth embodiment, the funneling member of the third embodiment has a generally toroidal shape.

In a fifth embodiment, the funneling passage of any of the third to fourth embodiments is narrower than the arcuate slot such that the sheet material is constrained in a transverse direction as the sheet material passes through the funneling passage.

In a sixth embodiment, the arcuate slot and the funneling member of any of the third to fifth embodiments are arranged such that the sheet material between the arcuate slot and the funneling member is in the form of a rolled-edge triangle.

In a seventh embodiment, the arcuate slot and the funneling member of any of the third to sixth embodiments are arranged such that, while the sheet material is fed between the arcuate slot and the funneling member, longitudinal edges of the sheet material coil progressively inward to form two converging truncated cones.

In an eighth embodiment, the funneling passage of any of the third to seventh embodiments has a shape that is either circular or ovoid.

In a ninth embodiment, the dunnage conversion system of claim 1 further includes at least one guide element positioned between the arcuate slot and the sheet material in the supply area.

In a tenth embodiment, the at least one guide element of the ninth embodiment is configured to limit a range of approach angles of the sheet material with respect to the arcuate slot.

In an eleventh embodiment, the arcuate slot of the tenth embodiment includes a convex edge and a concave edge. The at least one guide element further includes a first cylindrical rod positioned forward of the convex edge and a second cylindrical rod positioned rearward of the concave edge.

In a twelfth embodiment, the sheet material in the supply area of any of the tenth or eleventh embodiments is a fanfolded stack of the sheet material. The at least one guide element extends substantially parallel to folds in sheet material in the fanfolded stack.

In a thirteenth embodiment, the dunnage conversion system of any of the preceding embodiments further includes a first bracket that includes a convex edge that forms a first side of the arcuate slot and a second bracket that includes a concave edge that forms a second side of the arcuate slot. The first and second brackets are spaced from each other such that the sheet material can pass through the arcuate slot as the sheet material is fed from the supply area to the dunnage conversion machine.

In a fourteenth embodiment, the first and second brackets of the thirteenth embodiment are fixedly coupled to the supply area.

In a fifteenth embodiment, the arcuate slot of any of the first to twelfth embodiments is formed in a single bracket.

In a sixteenth embodiment, the arcuate slot of any of the preceding embodiments is selectively movable with respect to the supply area.

In a seventeenth embodiment, the arcuate slot of any of the preceding embodiments includes a convex edge and a concave edge.

In an eighteenth embodiment, at least one of the convex and concave edges of the seventeenth embodiment is an unfished cut edge.

In a nineteenth embodiment, the dunnage conversion system of any of the seventeenth to eighteenth embodiments includes at least one trim strip on one or both of the convex and concave edges.

In a twentieth embodiment, a radius of the convex edge of any of the seventeenth to nineteenth embodiments is in a range between 11 in (27.9 cm) and 15 in (38.1 cm).

In a twenty first embodiment, a width between the convex edge and the concave edge of any of the seventeenth to twentieth embodiments is in a range between 0.125 in (0.318 cm) and 0.375 in (0.953 cm).

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1A:
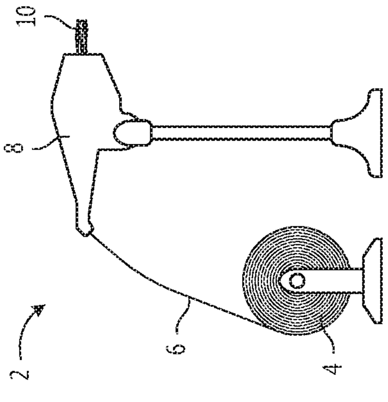
FIGS. 1A and 1B depict embodiments of dunnage conversion systems, in accordance with the embodiments disclosed herein.

Depicted in FIG. 1A is an embodiment of a dunnage conversion system 2. The dunnage conversion system 2 includes a source 4 of sheet material 6. In the depicted embodiment, the source 4 is a roll of the sheet material 6. In some embodiments, the sheet material 6 is a paper-based material, such as Kraft paper. In the source 4, the sheet material 6 is in a substantially flat configuration. For example, the roll may hold a single ply of Kraft paper that is flat across the width of the roll. In another example, the roll may hold multi-ply sheet material where each ply is flat across the width of the roll. In another example, a single sheet of paper may be folded longitudinally so that the paper on either side of the fold is flat and the paper is rolled such that the longitudinal fold is on one side of the roll and the two longitudinal edges are on the other side of the of roll. Many other variations of the source 4 of the sheet material 6 in the form of a roll are possible.

The dunnage conversion system 2 includes a dunnage conversion machine 8. The dunnage conversion machine 8 is configured to configured to convert the sheet material from the substantially flat configuration of the sheet material 6 into a non-flat configuration of a pad 10. In some embodiments, the sheet material 6 is Kraft paper and the dunnage conversion machine 8 is configured to manipulate the Kraft paper in such a way as to convert the paper into the pad 10 that can serve as a low-density void fill material. In some embodiments, the dunnage conversion machine 8 includes a severing mechanism to cut the pad 10 at intervals to form individual pads. In some embodiments, the dunnage conversion machine 8 further includes a drive system configured to feed (e.g., pull) the sheet material 6 from the source 4 into the dunnage conversion machine 8 and to feed the sheet material 6 through the dunnage conversion machine 8 as the sheet material 6 is converted into the pad 10.

Figure 1B:
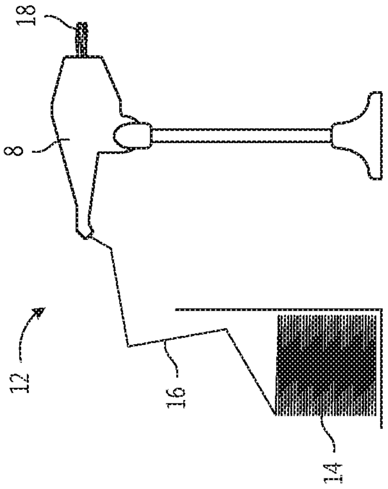

Depicted in FIG. 1B is an embodiment of a dunnage conversion system 12.

The dunnage conversion system 12 includes a source 14 of sheet material 16. In the depicted embodiment, the source 14 is a fanfolded stack of the sheet material 16. In some embodiments, the sheet material 16 is a paper-based material, such as Kraft paper. In the source 14, the sheet material 16 is in a substantially flat configuration. For example, the fanfolded stack may hold a single ply of Kraft paper that is flat between the transverse folds and across the width of the fanfolded stack. In another example, the fanfolded stack may hold multi-ply sheet material where each ply is flat between the transverse folds and across the width of the fanfolded stack. Many other variations of the source 4 of the sheet material 6 in the form of a fanfolded stack are possible. The dunnage conversion machine 8 in the dunnage conversion system 12 is the same as the dunnage conversion machine 8 in the dunnage conversion system 2 and is capable of converting the sheet material 16 into the pad 18.

One difficulty with feeding sheet material is dunnage conversion machines is the in-plane stiffness of the sheet material. This in-plane stiffness complicates the action of forming a broad, flat sheet material or web into a tightly formed or crumpled dunnage pad. If this forming is not controlled, the sheet material may fold back upon itself in a variety of ways that form relatively strong or rigid structures. These rigid structures may hook over or wedge inside of the sheet material forming or guiding elements, creating resistance to advancing the paper. This resistance slows the operation of the dunnage converting machine and frequently is enough to tear the sheet material or jam the moving parts of the dunnage conversion machine. In some embodiments, it would be advantageous to feed the sheet material from the supply to the dunnage conversion machine in a way that avoids excessively high local tension—which could cause tearing—and local compression—which could cause buckling and the formation of rigid structures. These goals are particularly difficult to achieve with fanfolded stacks of paper that have very low tension compared to rolls of sheet material and the presence of the alternating folds can increase uncontrolled motion and/or flutter of the sheet material.

The present disclosure describes embodiments of feeding systems for properly feeding sheet material to a dunnage conversion machine. In some embodiments, dunnage conversion systems include arcuate slots through which the sheet material is fed on a path to a dunnage conversion machine. The arcuate slot biases the sheet material from a flat arrangement to a curved arrangement. The sheet material may be less likely to fold back upon itself in a way that form relatively strong or rigid structures. In some embodiments, dunnage conversion systems may further bias the sheet material into a further curved shape after the sheet material passes through the arcuate slot and before the sheet material reaches the dunnage conversion machine.

Figure 2:
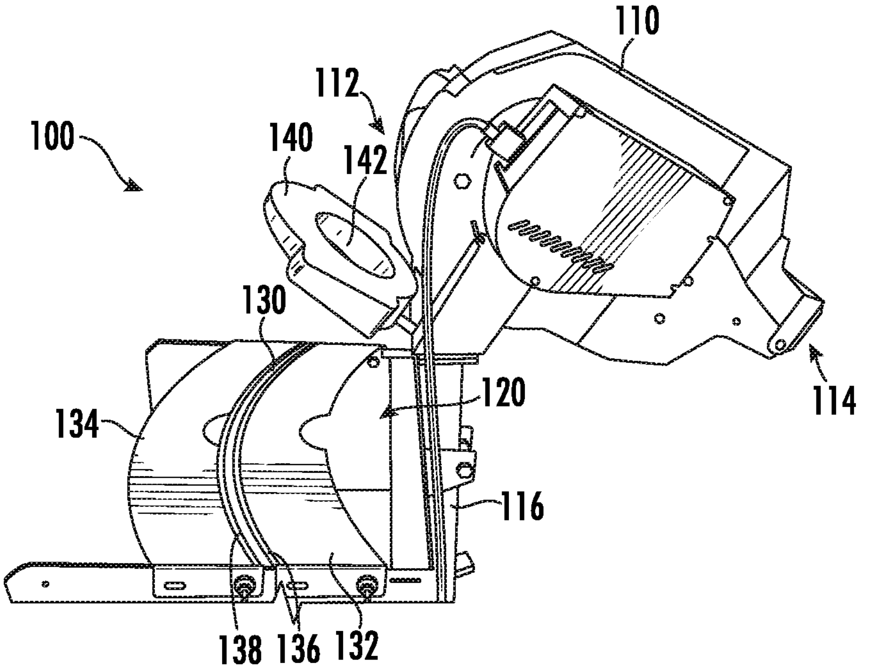
FIG. 2 depicts a side view of a dunnage conversion system, in accordance with the embodiments disclosed herein.

Depicted in FIG. 2 is a side view of a dunnage conversion system 100. The dunnage conversion system 100 includes a dunnage conversion machine 110. The dunnage conversion machine 110 includes an inlet 112 configured to receive sheet material and an outlet 114 configured to output a pad formed by manipulating the sheet material to form the pad that can serve as a low-density void fill material. In some embodiments, the dunnage conversion machine 110 includes a drive system (not visible) located between the inlet 112 and the outlet 114. In some embodiments, the drive system is configured to pull sheet material from the inlet 112 to the outlet 114 and to convert the sheet material into a pad that can be used for void fill. In the depicted embodiment, the dunnage conversion system 100 includes a stand 116 configured to hold the dunnage conversion machine 110 off of a surface (e.g., a floor, a table, a workbench, etc.).

The dunnage conversion system 100 also includes a supply area 120 configured to hold a supply of a sheet material. In some embodiments, the sheet material is fed from the supply area 120 to the inlet 112 of the dunnage conversion machine 110. In some embodiments, the drive system is configured to pull sheet material from the supply area 120 to the inlet 112. In some embodiments, the sheet material in the supply area 120 includes a fanfolded stack of the sheet material. In some embodiments, the sheet material in the supply area 120 includes a roll of the sheet material.

The dunnage conversion system 100 also includes an arcuate slot 130 located between the supply area 120 and the dunnage conversion machine 110. The sheet material is configured to pass through the arcuate slot 130 as the sheet material passes from the supply area 120 to the dunnage conversion machine 110. In the depicted embodiment, the arcuate slot 130 spans the entire width of the supply area 120. In the embodiment, the dunnage conversion machine 110 is located on the concave side of the arcuate slot 130. In the depicted embodiment, the arcuate slot 130 is formed by two brackets 132 and 134. The bracket 132 includes a convex edge 136 that forms one side of the arcuate slot 130 and the bracket 134 includes a concave edge 138 that forms another side of the arcuate slot 130. The brackets 132 and 134 are spaced from each other such that sheet material can pass through the arcuate slot 130 as the sheet material is fed from the supply area 120 to the dunnage conversion machine 110. In some embodiments, the brackets 132 and 134 are formed from sheet metal (e.g., 14 gauge sheet metal). In the depicted embodiment, the dunnage conversion system 100 includes a trim strip (e.g., a plastic trim strip) across portions of each of the convex edge 136 of the bracket 132 and the concave edge 138 of the bracket 134. The trim strips are configured to reduce the likelihood of the sheet material catching and/or tearing as it passes through the arcuate slot 130. In other embodiments, the convex edge 136 and the concave edge 138 may be uncovered. For example, the convex edge 136 and the concave edge 138 may be unfinished laser cut edges of sheet metal.

In the depicted embodiment, the dunnage conversion system 100 also includes a funneling member 140. The funneling member 140 includes a funneling passage 142 through which the sheet material can pass as the sheet material is fed from the arcuate slot 130 to the dunnage conversion machine 110. In some embodiments, the funneling member has a generally toroidal shape (e.g., a torus) such that the funneling passage 142 is a hole through the funneling member 140. The funneling member 140 is configured to further constrain the sheet material from the shape of the sheet material at the arcuate slot 130. In some embodiments, the funneling passage 142 is narrower than the arcuate slot 130 such that the sheet material 122 is constrained in the transverse direction as the sheet material passes through the funneling passage 142.

Figure 3:
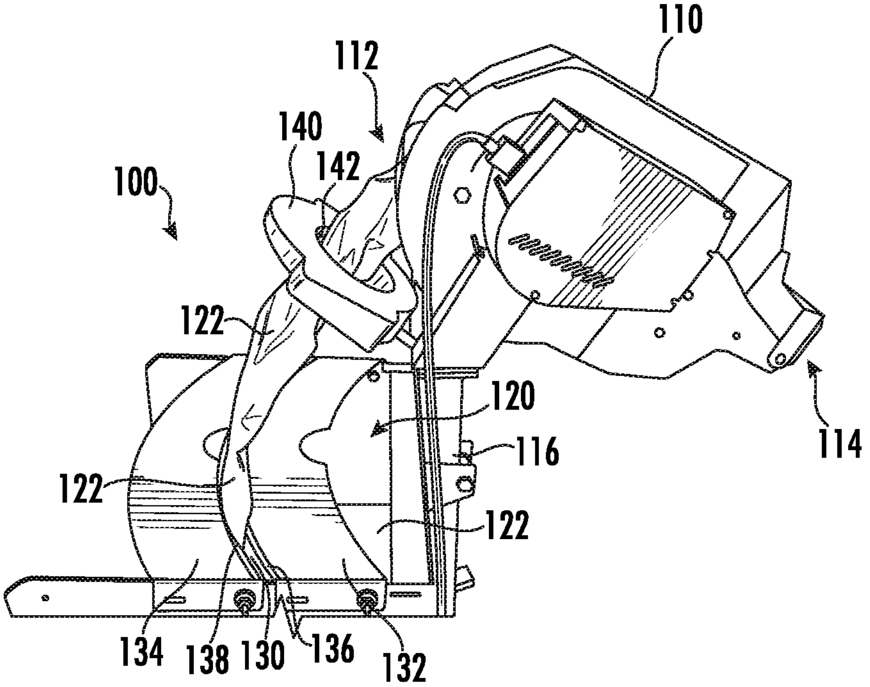
FIGS. 3 and 4 depict side and back views, respectively, of the dunnage conversion system shown in FIG. 2 as a sheet material is fed along a path through the dunnage conversion system, in accordance with the embodiments disclosed herein.
Figure 4:
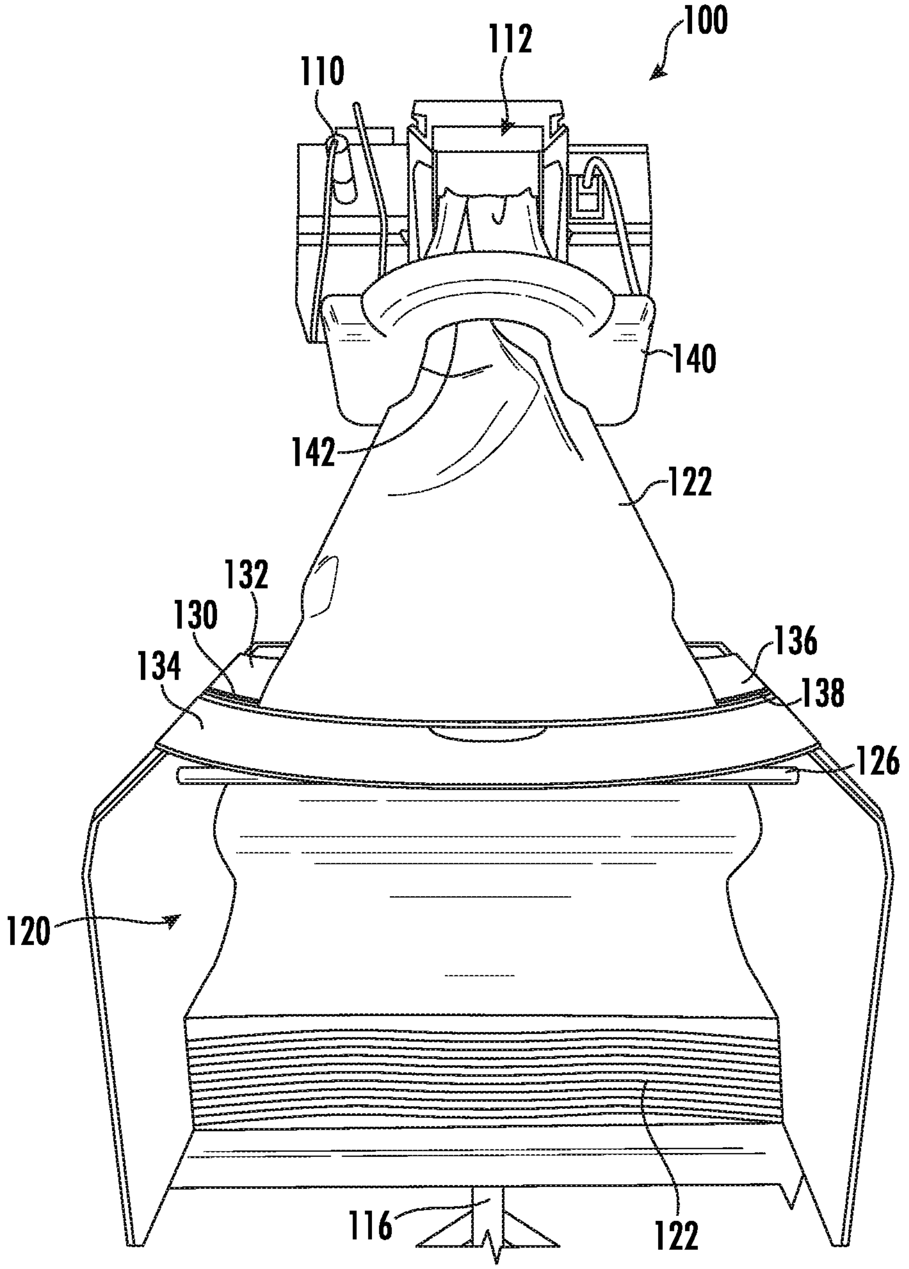

Depicted in FIGS. 3 and 4 are side and back views, respectively, of the dunnage conversion system 100 as a sheet material 122 is fed along a path through the dunnage conversion system 100. In the depicted embodiment, the sheet material 122 is a sheet of Kraft paper. In the depicted embodiment, the sheet material 122 in the supply area 120 is in the form of a fanfolded stack of Kraft paper. In other embodiments, the sheet material 122 in the supply area 120 can be a roll of sheet material or any other form of a supply of the sheet material. The sheet material 122 in the supply area 120 is fed to the arcuate slot 130. In some embodiments, such as when the sheet material 122 in the supply area 120 is a fanfolded stack, the sheet material 122 approaches the arcuate slot 130 from a wide range of angles. At extreme approach angles, sheet material 122 can catch, tear, or otherwise feed poorly at the arcuate slot 130. In some embodiments, the supply area 120 includes guide elements 124 and 126 on either side of the arcuate slot 130 where the guide elements are configured to limit the range of approach angles of the sheet material 122 with respect to the arcuate slot 130. In the depicted embodiment, the guide element 124 is located forward of the convex edge 136 and the guide element 126 is located rearward of the concave edge 138. In the depicted embodiment, the guide elements 124 and 126 are in the form of cylindrical rods around which the sheet material 122 is capable of bending as the sheet material 122 is being fed to the arcuate slot 130. In some embodiments where the sheet material 122 in the supply area 120 is in a fanfolded stack, the guide elements 124 and 126 extend substantially parallel to the folds in sheet material 122 in the fanfolded stack.

As the sheet material 122 passes through the arcuate slot 130, the sheet material 122 bends from a relatively flat configuration when in the supply area 120 to a curved configuration when passing through the arcuate slot 130. The arcuate slot 130 causes the sheet material 122 to have a substantially consistent curvature with a radius of the curvature normal to the direction of travel of the sheet material 122. The curvature of the sheet material 122 at the arcuate slot 130 biases the sheet material 122 to a particular shape as the sheet material 122 reaches the funneling member 140. Embodiments of shapes of sheet material between an arcuate slot and a funneling member are discussed in greater detail below. As the sheet material 122 passes through the funneling passage 142 of the funneling member 140, the funneling passage 142 constrains the sheet material 122 to a particular shape. In some embodiments, the shape of the sheet material 122 when existing the funneling passage 142 is substantially the same as the shape of the sheet material 122 when entering the inlet 112 of the dunnage conversion machine 110. In some embodiments, the angle of the funneling member 140 with respect to the dunnage conversion machine 110 is fixed. In other embodiments, the funneling member 140 is configured to be selectively moved with respect to the dunnage conversion machine 110 such that the angle of the funneling member 140 with respect to the dunnage conversion machine 110 is selectively variable.

Figure 5A:
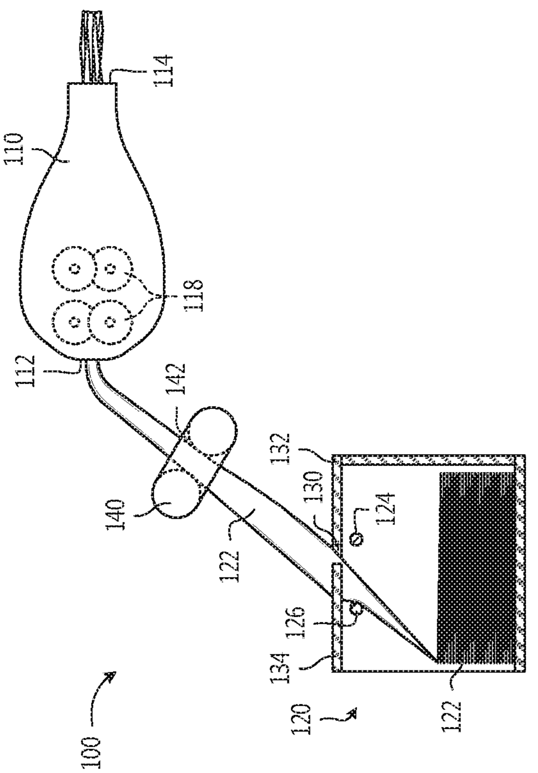
FIGS. 5A and 5B depict side and top schematic views, respectively, of the dunnage conversion system shown in FIGS. 2 to 4, in accordance with the embodiments disclosed herein.
Figure 5B:
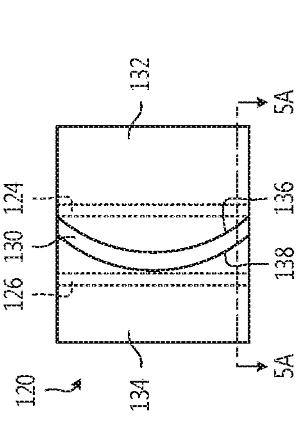

Depicted in FIGS. 5A and 5B are side and top schematic views, respectively, of the dunnage conversion system 100. In the side view of FIG. 5A, a cross-section of the supply area 120 and the arcuate slot 130 is shown. In the depicted embodiment, the sheet material 122 in the supply area 120 is a fanfolded stack with the folds in the sheet material located at the front (e.g., the right when viewing FIG. 5A) and at the back (e.g., the left when viewing FIG. 5A) of the supply area 120. The sheet material 122 is pulled by a drive system 118 in the dunnage conversion machine 110. In the depicted embodiment, the sheet material 122 is pulled from the supply area 120, through the arcuate slot 130, through the funneling member 140, and into the inlet 112 of the dunnage conversion machine 110. At the instance shown in FIG. 5A, the sheet material 122 is being pulled from a rear fold in the fanfold stack. As the sheet material 122 passes to the arcuate slot 130, at least a portion of the sheet material 122 contacts and bends around the guide element 126. As can be seen in FIG. 5A, the angle of the sheet material 122 between the fanfold stack and the guide element 126 is steeper than the angle of the sheet material between the guide element 126 and the arcuate slot 130. In this way, the guide element 126 reduces the possibility of the sheet material 122 feeding improperly as the sheet material 122 passes through the arcuate slot 130.

Figure 5C:
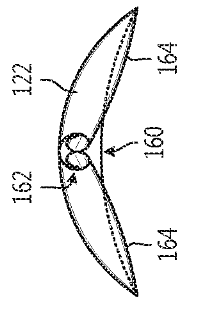
FIGS. 5C and 5D depict longitudinal and bottom views, respectively, of the sheet material shown in FIGS. 3 and 4 between a transverse shape of the sheet material at the arcuate slot and a transverse shape of the sheet material at the funneling member, in accordance with the embodiments disclosed herein.
Figure 5D:
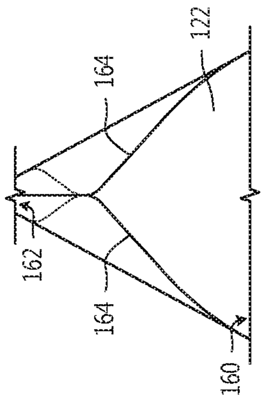

As noted above, the sheet material 122 can be formed into a particular shape when passing through the arcuate slot 130 and into a particular shape when passing through the funneling member 140. Depicted in FIGS. 5C and 5D are longitudinal and bottom views, respectively, of the sheet material 122 between a transverse shape 160 of the sheet material 122 at the arcuate slot 130 and a transverse shape 162 of the sheet material 122 at the funneling member 140. Also shown in FIGS. 5C and 5D are paths of the longitudinal edges 164 of the sheet material 122. As can be seen in FIG. 5C, the transverse shape 160 of the sheet material 122 is generally arcuate at the arcuate slot 130 and the transverse shape 162 of the sheet material 122 is generally circular or ovoid at the funneling member 140. As can be seen in FIG. 5D, the longitudinal shape of the sheet material 122 between the arcuate slot 130 and the funneling member 140 is generally triangular. As the sheet material 122 is fed from the arcuate slot 130 to the funneling member 140, the longitudinal edges 164 of the sheet material 122 coil progressively inward to form two converging truncated cones. This three-dimensional shape of the sheet material 122 is sometimes called a "rolled-edge triangle."

One of the difficulties with feeding sheet material from a fanfolded stack is the relatively low tension in the sheet material compared to other types of sheet material supply (e.g., a roll of sheet material). In addition, the presence of the alternating folds in a fanfolded stack can increase uncontrolled motion or flutter of the sheet material. The passage of the sheet material 122 through the arcuate slot 130 adds tension to the sheet material as it is being fed, which address the issue of the low tension in the fanfolded stack. The formation of the sheet material 122 into the rolled-edge triangle also addresses uncontrolled motion or flutter of the sheet material 122. The rolled-edge triangle shape is a regular path for the sheet material 122 along which the sheet material 122 may converge without excessive local tension or compression. While efforts to form this rolled-edge triangle shape in sheet material have been accomplished in the past, those efforts have resulted in machines that have large guides that are complex and difficult to assemble and more expensive to fabricate. The embodiment of the arcuate slot 130 and the funneling member 140 are able to create the rolled-edge triangle in the sheet material 122 consistently, passively, and in a system that is relatively easy to assemble and fabricate.

Figure 6:
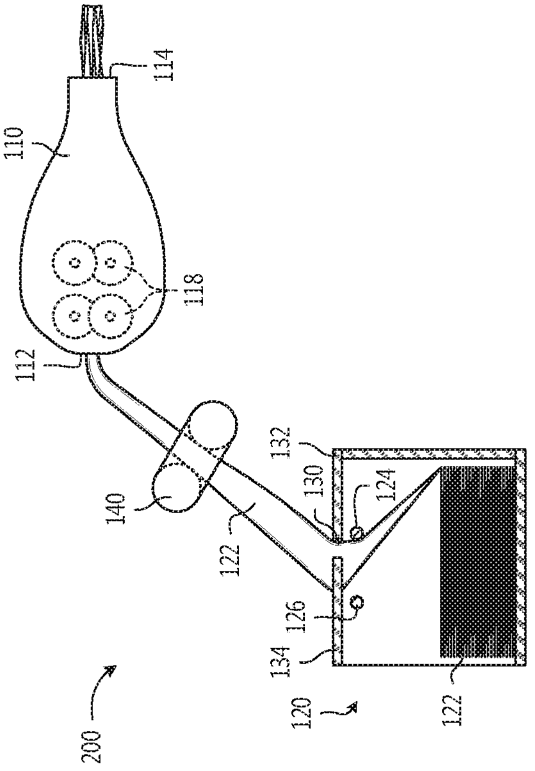
FIG. 6 depicts a side view of the supply area shown in FIG. 5A at another instance of the sheet material being pulled from the supply area, in accordance with the embodiments disclosed herein.

Another instance of the sheet material 122 being pulled from the supply area is shown in FIG. 6. More specifically, at the instance shown in FIG. 6, the sheet material 122 is being pulled from a front fold in the fanfold stack. As the sheet material 122 passes to the arcuate slot 130, at least a portion of the sheet material 122 contacts and bends around the guide element 124. As can be seen in FIG. 6, the angle of the sheet material 122 between the fanfold stack and the guide element 124 is steeper than the angle of the sheet material between the guide element 124 and the arcuate slot 130. In this way, the guide element 124 reduces the possibility of the sheet material 122 feeding improperly as the sheet material 122 passes through the arcuate slot 130.

Figure 7:
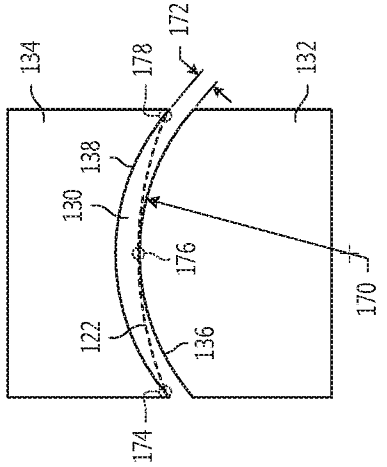
FIG. 7 depicts some of the dimensions of an arcuate slot that can be selected based on a desired effect of the arcuate slot on the sheet material, in accordance with the embodiments disclosed herein.

In some embodiments, the dimensions of the arcuate slot 130 are selected based on a desired effect of the arcuate slot 130 on the sheet material 122. For example, the dimensions of the arcuate slot 130 can be selected based on one or more of a particular transverse shape of the sheet material 122 as the sheet material 122 passes through the arcuate slot 130, an amount of tension induced in the sheet material 122 as the sheet material 122 passes through the arcuate slot 130, and the like. FIG. 7 depicts some of the dimensions of the arcuate slot 130 that can be selected. In particular, FIG. 7 depicts a radius 170 of the convex edge 136 and a width 172 of the arcuate slot 130. In some embodiments, the radius 170 of the convex edge 136 is in a range between 11 in (27.9 cm) and 15 in (38.1 cm). In some embodiments, the width 172 of the arcuate slot 130 is in a range between 0.125 in (0.318 cm) and 0.375 in (0.953 cm). In one embodiment, the radius 170 of the convex edge 136 is about 12.8 in (32.5 cm) and the width 172 of the arcuate slot 130 is about 0.20 in (0.50 cm). In some embodiments, the concave edge 138 has substantially the same radius as the convex edge 136 and is offset from the convex edge 136 by the width 172 of the arcuate slot 130. In some embodiments, the concave edge 138 is substantially concentric with the convex edge 136 and the radius of the concave edge 138 is greater than the radius 170 of the convex edge 136 by the amount of the width 172 of the arcuate slot 130.

FIG. 7 also shows an embodiment of a profile of the sheet material 122 as the sheet material 122 passes through the arcuate slot 130. The sheet material 122 is typically biased to be in a flat configuration and is constrained by the arcuate slot 130. This biasing of the sheet material 122 to the flat configuration tends to cause the sheet material 122 to contact the convex edge 136 and concave edge 138 in a few places, instead of the sheet material 122 riding along one of the convex edge 136 and concave edge 138. In the depicted embodiment, the sheet material 122 is expected to contact the edges of the arcuate slot 130 at expected contact points 174, 176, and 178. In particular, it is expected that the longitudinal edges of the sheet material 122 will contact the concave edge 138 of the arcuate slot 130 at the expected contact points 174 and 178, and that some portion of the sheet material 122 between the longitudinal edges will contact the convex edge 136 of the arcuate slot 130 at the expected contact point 176. It will be apparent that the sheet material 122 can have a different curvature than each of the convex edge 136 and the concave edge 138 at the point where the sheet material 122 passes through the arcuate slot 130. The curvature of the sheet material 122 in the arcuate slot 130 is based on the dimensions of the arcuate slot 130, such as the radius 170 of the convex edge 136, the width 172 of the arcuate slot 130, the radius of the concave edge 138, any other dimension of the arcuate slot 130 (e.g., the thickness of the brackets 132 and 134), or any combination thereof.

Figure 8:
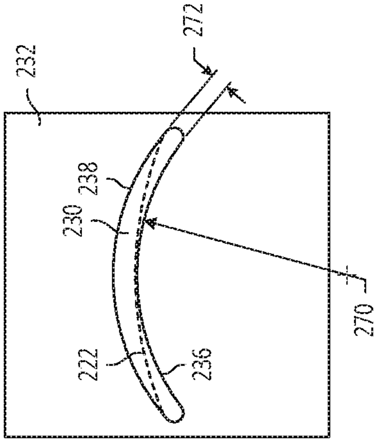
FIG. 8 depicts an embodiment of an arcuate slot formed in a single bracket, in accordance with the embodiments disclosed herein.

In the embodiments described above, arcuate slots were depicted and described as being formed by the edges of two separate brackets. In other embodiments, an arcuate slot can be formed from any number of brackets, including a single bracket. Depicted in FIG. 8 is an embodiment of an arcuate slot 230 formed in a single bracket 232. The arcuate slot 230 includes a convex edge 236 and a concave edge 238. In the depicted embodiment, the convex edge 236 and the concave edge 238 do not extend to the sides of the bracket 232 so that the entirety of the arcuate slot 230 is in the bracket 232. FIG. 8 also shows that the arcuate slot 230 can be dimensioned in ways similar to those described above with respect to the arcuate slot 130. In particular, a radius 270 of the convex edge 236 and a width 272 between the convex edge 236 and the concave edge 238 can be selected based on a desired shape of a sheet material 222 that passes through the arcuate slot 230. In the depicted embodiment, the arcuate slot 230 has a length that is longer than the width of the sheet material 222 so that the sheet material 222 is capable of passing through the arcuate slot 230 without being folded or crumpled. The depicted path of the sheet material 222 is also expected to contact the edges of the arcuate slot 230 similar to the way in which the sheet material 122 is expected to contact the arcuate slot 130, as described above.

Figure 9A:
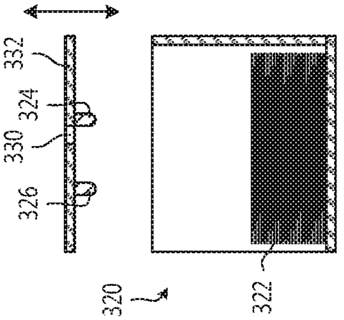
FIGS. 9A and 9B depict cross-sectional side and top views, respectively, of a supply area and an arcuate slot, in accordance with the embodiments disclosed herein.
Figure 9B:
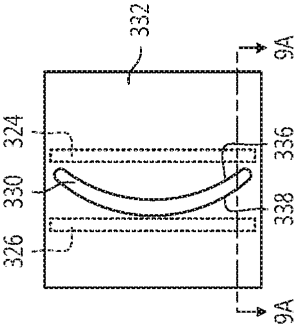

In the embodiment shown in FIGS. 2 to 4, the brackets 132 and 134 that form the arcuate slot 130 are fixedly coupled to the supply area 120. In other embodiment, the bracket or brackets that form an arcuate slot may be selectively positionable with respect to a supply area. Depicted in FIGS. 9A and 9B are cross-sectional side and top views, respectively, of a supply area 320 and an arcuate slot 330. The supply area 320 holds a supply of a sheet material 322 in the form of a fanfolded stack of the sheet material 322. The arcuate slot 330 is located in a bracket 332. The arcuate slot 330 includes a convex edge 336 and a concave edge 338. While the arcuate slot 330 is formed from a single bracket 332 in the depicted embodiment, it will be understood that the arcuate slot 330 could be formed from multiple brackets. The bracket 332 also includes guide elements 324 and 326 coupled to the bottom of the bracket 332. The guide elements 324 and 326 are configured to limit the range of approach angles of the sheet material 322 with respect to the arcuate slot 330.

In the embodiment depicted in FIG. 9A, the bracket 332 is positioned above the supply area 320. As indicated by the arrows next to the bracket 332, the bracket 332 is capable of being moved vertically so that the bracket 332 is closer to or further away from the supply area 320. This ability to move the bracket 332 allows for fanfold stacks of various heights to be used in the supply area 320. In other embodiments, the bracket 332 is capable of being moved laterally (e.g., left and right when viewing FIG. 9A). In other embodiments, the bracket 332 is capable of being rotated or otherwise reoriented in any way.

Figure 10A:
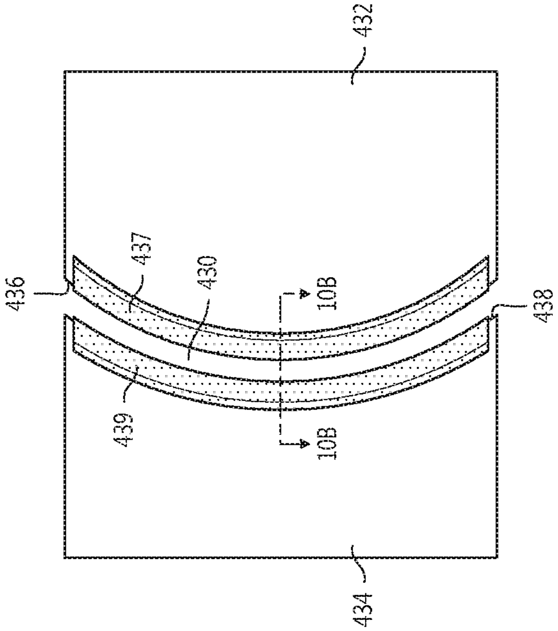
FIGS. 10A and B depict top and cross-sectional side views, respectively, of an embodiment of an arcuate slot with convex and concave edges that have trim strips, in accordance with the embodiments disclosed herein.
Figure 10B:
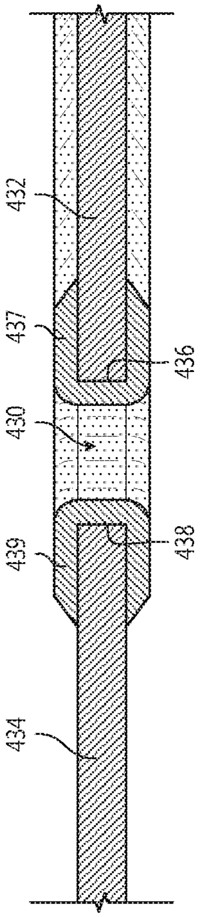

As noted above, the convex and concave edges of arcuate slots can be unfinished cuts, finished cuts, or cuts that have been covered by a trim strip. Depicted in FIGS. 10A and 10B are top and cross-sectional side views, respectively, of an embodiment of an arcuate slot 430 with convex and concave edges that have trim strips 437 and 439. The arcuate slot 430 is formed by a bracket 432 that has a convex edge 436 and a bracket 434 that has a concave edge 438. The brackets 432 and 434 are arranged such that the convex edge 436 and the concave edge 438 form the arcuate slot 430. The trim strip 437 is slid over portions of the convex edge 436 and the trim strip 439 is slid over portions of the concave edge 438. In some embodiments, the trim strips 437 and 439 are made from a flexible material, such as a plastic material. In some embodiments, the trim strips 437 and 439 are push-on, molybdenum disulfide-filled, nylon plastic strips.

For purposes of this disclosure, terminology such as “upper,” “lower,” “vertical,” “horizontal,” “inwardly,” “outwardly,” “inner,” “outer,” “front,” “rear,” and the like, should be construed as descriptive and not limiting the scope of the claimed subject matter. Further, the use of “including,” “comprising,” or “having” and variations thereof herein is meant to encompass the items listed thereafter and equivalents thereof as well as additional items. Unless limited otherwise, the terms “connected,” “coupled,” and “mounted” and variations thereof herein are used broadly and encompass direct and indirect connections, couplings, and mountings. Unless stated otherwise, the terms “substantially,” “approximately,” and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A dunnage conversion system, comprising:

a supply area configured to hold a supply of a sheet material, wherein the sheet material is in a substantially flat configuration in the supply area;

a dunnage conversion machine configured to pull the sheet material from the supply area and to convert the sheet material into a non-flat configuration; and an arcuate slot positioned between the supply area and the dunnage conversion machine such that the sheet material is fed through the arcuate slot as the sheet material passes along a path from the supply area to the dunnage conversion machine, wherein the arcuate slot comprises a convex edge and a concave edge;

a funneling member having a funneling passage, wherein the funneling member is positioned such that the sheet material passes through the funneling passage of the funneling member after passing through the arcuate slot on the path from the supply area to the dunnage conversion machine.

2. The dunnage conversion system of claim 1, wherein the arcuate slot is configured to cause the sheet material to have a curvature with a radius of the curvature normal to a direction of travel of the sheet material on the path from the supply area to the dunnage conversion machine.

3. The dunnage conversion system of claim 1, wherein the funneling member has a generally toroidal shape.

4. The dunnage conversion system of claim 1, wherein the funneling passage is narrower than the arcuate slot such that the sheet material is constrained in a transverse direction as the sheet material passes through the funneling passage.

5. The dunnage conversion system of claim 1, wherein the arcuate slot and the funneling member are arranged such that the sheet material between the arcuate slot and the funneling member is in the form of a rolled-edge triangle.

6. The dunnage conversion system of claim 1, wherein the arcuate slot and the funneling member are arranged such that, while the sheet material is fed between the arcuate slot and the funneling member, longitudinal edges of the sheet material coil progressively inward to form two converging truncated cones.

7. The dunnage conversion system of claim 1, wherein the funneling passage has a shape that is either circular or ovoid.

8. The dunnage conversion system of claim 1, further comprising:

at least one guide element positioned between the arcuate slot and the sheet material in the supply area.

9. The dunnage conversion system of claim 8, wherein the at least one guide element is configured to limit a range of approach angles of the sheet material with respect to the arcuate slot.

10. The dunnage conversion system of claim 9, wherein the sheet material in the supply area is a fanfolded stack of the sheet material, and wherein the at least one guide element extends substantially parallel to folds in sheet material in the fanfolded stack.

11. The dunnage conversion system of claim 1, further comprising:

a first bracket that includes a convex edge that forms a first side of the arcuate slot; and a second bracket that includes a concave edge that forms a second side of the arcuate slot;

wherein the first and second brackets are spaced from each other such that the sheet material can pass through the arcuate slot as the sheet material is fed from the supply area to the dunnage conversion machine.

12. The dunnage conversion system of claim 11, wherein the first and second brackets are fixedly coupled to the supply area.

13. The dunnage conversion system of claim 1, wherein the arcuate slot is formed in a single bracket.

14. The dunnage conversion system of claim 1, wherein the arcuate slot is selectively movable with respect to the supply area.

15. The dunnage conversion system of claim 1, wherein the arcuate slot includes a convex edge and a concave edge.

16. The dunnage conversion system of claim 15, wherein at least one of the convex and concave edges is an unfinished cut edge.

17. The dunnage conversion system of claim 15, further comprising at least one trim strip on one or both of the convex and concave edges.

18. The dunnage conversion system of claim 15, wherein a radius of the convex edge is in a range between 11 in (27.9 cm) and 15 in (38.1 cm).

19. The dunnage conversion system of claim 18, wherein a width between the convex edge and the concave edge is in a range between 0.125 in (0.318 cm) and 0.375 in (0.953 cm).

20. A dunnage conversion system, comprising:

a supply area configured to hold a supply of a sheet material, wherein the sheet material is in a substantially flat configuration in the supply area;

a dunnage conversion machine configured to pull the sheet material from the supply area and to convert the sheet material into a non-flat configuration;

an arcuate slot positioned between the supply area and the dunnage conversion machine such that the sheet material is fed through the arcuate slot as the sheet material passes along a path from the supply area to the dunnage conversion machine; and at least one guide element positioned between the arcuate slot and the sheet material in the supply area, wherein the at least one guide element is configured to limit a range of approach angles of the sheet material with respect to the arcuate slot;

wherein the arcuate slot comprises a convex edge and a concave edge, and wherein the at least one guide element comprises:

a first cylindrical rod positioned forward of the convex edge; and a second cylindrical rod positioned rearward of the concave edge.

* * * * *